(12) United States Patent
Li et al.

(10) Patent No.: US 10,568,108 B2
(45) Date of Patent: Feb. 18, 2020

(54) CHANNEL ACCESS PERIOD ALLOCATION METHOD, APPARATUS, AND SYSTEM

(71) Applicant: HUAWEI TECHNOLOGIES CO., LTD., Shenzhen (CN)

(72) Inventors: Yong Li, Chongqing (CN); Dejian Li, Beijing (CN); Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 15/866,253

(22) Filed: Jan. 9, 2018

(65) Prior Publication Data
US 2018/0132253 A1    May 10, 2018

Related U.S. Application Data

(63) Continuation of application No. PCT/CN2015/083755, filed on Jul. 10, 2015.

(51) Int. Cl.
*H04W 72/08* (2009.01)
*H04W 28/04* (2009.01)
(Continued)

(52) U.S. Cl.
CPC ......... *H04W 72/087* (2013.01); *H04W 28/04* (2013.01); *H04W 36/30* (2013.01); *H04W 36/38* (2013.01); *H04W 72/0446* (2013.01)

(58) Field of Classification Search
None
See application file for complete search history.

(56) References Cited

U.S. PATENT DOCUMENTS

| 5,734,867 A | * | 3/1998 | Clanton | ................ H04L 47/805 370/337 |
| 5,784,597 A | * | 7/1998 | Chiu | ........................ H04J 1/12 370/252 |

(Continued)

FOREIGN PATENT DOCUMENTS

| CN | 101060474 A | 10/2007 |
| CN | 101262631 A | 9/2008 |

(Continued)

OTHER PUBLICATIONS

International Search Report and Written Opinion (including English translation) issued in corresponding International Application No. PCT/CN2015/083755, dated Mar. 24, 2016, 17 pages.

*Primary Examiner* — Ayaz R Sheikh
*Assistant Examiner* — Tarell A Hampton
(74) *Attorney, Agent, or Firm* — Leydig, Voit & Mayer, Ltd.

(57) ABSTRACT

Examples of the present disclosure provide a channel access period allocation method. The method includes: receiving, by an access point (AP), first information sent by a first station (STA) for requesting a dynamic service period (DSP) from the AP; and sending, by the AP, second information to the first STA to instruct the first STA to send a data frame to the AP in a first DSP, where a start time of the first DSP falls within a first preset time period following an end time of an SP of the first STA, and the first DSP requested by the first STA is pre-allocated to a second STA having a priority that is lower than that of the first STA, where a time delay of the first STA for sending the data frame to the AP satisfies a time delay requirement of a quality of service QoS in the first preset time period.

12 Claims, 6 Drawing Sheets

(51) Int. Cl.
 *H04W 36/20* (2009.01)
 *H04W 36/38* (2009.01)
 *H04W 72/04* (2009.01)
 *H04W 36/30* (2009.01)

(56) References Cited

U.S. PATENT DOCUMENTS

| | | | | |
|---|---|---|---|---|
| 6,058,307 A * | 5/2000 | Garner | | H04B 7/18539 455/428 |
| 6,192,230 B1 * | 2/2001 | van Bokhorst | | H04W 52/0216 455/343.3 |
| 6,212,173 B1 * | 4/2001 | Lindsay | | G10L 19/012 370/331 |
| 6,236,855 B1 * | 5/2001 | Austin | | H04L 1/0079 455/423 |
| 6,778,509 B1 * | 8/2004 | Ravishankar | | H04B 7/18589 370/322 |
| 6,928,061 B1 * | 8/2005 | Garcia-Luna-Aceves | | H04W 72/1278 370/329 |
| 7,496,112 B1 * | 2/2009 | Danielson | | H04J 3/1682 370/458 |
| 7,593,321 B2 * | 9/2009 | Galand | | H04L 1/22 370/218 |
| 7,639,663 B1 * | 12/2009 | Nerses | | H04L 47/14 370/347 |
| 7,808,941 B2 * | 10/2010 | Ramos | | H04L 47/14 370/310 |
| 9,001,800 B2 * | 4/2015 | Habetha | | H04W 74/04 370/338 |
| 9,351,301 B2 * | 5/2016 | Lee | | H04W 72/0446 |
| 2002/0071449 A1 * | 6/2002 | Ho | | H04L 12/403 370/447 |
| 2002/0126692 A1 * | 9/2002 | Haartsen | | H04W 72/10 370/450 |
| 2003/0161340 A1 * | 8/2003 | Sherman | | H04L 47/24 370/445 |
| 2004/0072586 A1 * | 4/2004 | Dorenbosch | | H04W 4/10 455/507 |
| 2004/0259542 A1 * | 12/2004 | Viitamaki | | H04L 12/12 455/426.2 |
| 2005/0122935 A1 * | 6/2005 | Mangin | | H04W 48/12 370/329 |
| 2006/0245440 A1 * | 11/2006 | Mizukoshi | | H04W 16/14 370/400 |
| 2008/0259895 A1 * | 10/2008 | Habetha | | H04W 74/04 370/345 |
| 2009/0022136 A1 * | 1/2009 | Joshi | | H04B 7/2123 370/348 |
| 2009/0279487 A1 * | 11/2009 | Reumerman | | H04W 40/24 370/329 |
| 2010/0142551 A1 | 6/2010 | Mosko et al. | | |
| 2010/0214992 A1 | 8/2010 | Hart et al. | | |
| 2010/0255850 A1 | 10/2010 | Kaukoranta et al. | | |
| 2010/0265925 A1 * | 10/2010 | Liu | | H04B 7/0617 370/336 |
| 2012/0106522 A1 * | 5/2012 | Reumerman | | H04W 48/08 370/337 |
| 2012/0120796 A1 | 5/2012 | Chu et al. | | |
| 2012/0127969 A1 * | 5/2012 | He | | H04W 74/085 370/336 |
| 2012/0195192 A1 | 8/2012 | Matthews et al. | | |
| 2013/0229995 A1 | 9/2013 | Cai et al. | | |
| 2014/0213273 A1 | 7/2014 | Xie et al. | | |
| 2014/0293976 A1 * | 10/2014 | Huang | | H04W 74/04 370/337 |
| 2014/0369339 A1 * | 12/2014 | Nekoui | | H04W 74/04 370/348 |
| 2016/0029403 A1 * | 1/2016 | Roy | | H04W 72/0406 370/336 |
| 2016/0316375 A1 | 10/2016 | Li | | |
| 2017/0238250 A1 * | 8/2017 | Guo | | H04W 52/0216 370/311 |
| 2017/0347355 A1 * | 11/2017 | Gou | | H04L 5/0082 |

FOREIGN PATENT DOCUMENTS

| | | |
|---|---|---|
| CN | 101409680 A | 4/2009 |
| CN | 101489304 A | 7/2009 |
| CN | 101500299 A | 8/2009 |
| CN | 101848542 A | 9/2010 |
| CN | 102196578 A | 9/2011 |
| CN | 102196598 A | 9/2011 |
| CN | 103118241 A | 5/2013 |
| CN | 103281793 A | 9/2013 |
| CN | 103457990 A | 12/2013 |
| CN | 103891336 A | 6/2014 |
| CN | 104170336 A | 11/2014 |

* cited by examiner

CHANNEL ACCESS PERIOD ALLOCATION METHOD, APPARATUS, AND SYSTEM

CROSS-REFERENCE TO RELATED APPLICATIONS

This application is a continuation of International Application No. PCT/CN2015/083755, filed on Jul. 10, 2015, the disclosure of which is hereby incorporated by reference in its entirety.

TECHNICAL FIELD

Examples of the present disclosure relate to communications technologies, and in particular, to a channel access period allocation method, apparatus, and system.

BACKGROUND

A video personal area network (VPAN) includes one access point (AP) and a specific quantity of stations (STA). A STA can transmit a data frame to the AP only after the STA accesses the AP. However, because only one STA can access the AP at a same time, the AP allocates different channel access periods to different STAs, so that a STA transmits a data frame to the AP in a channel access period corresponding to the STA.

SUMMARY

Examples of the present disclosure provide a channel access period allocation method and apparatus.

According to a first aspect, a channel access period allocation method is provided. The method may include: receiving, by an access point (AP), first information sent by a first station (STA), where the first information is used by the first STA to request a dynamic service period (DSP) from the AP; and sending, by the AP, second information to the first STA, where the second information is used to instruct the first STA to send a data frame to the AP in a first DSP, where a start time of the first DSP falls within a first preset time period following an end time of a service period (SP) of the first STA, and the first DSP requested by the first STA is pre-allocated to a second STA having a priority that is lower than that of the first STA, where a time delay of the first STA for sending the data frame to the AP satisfies a time delay requirement of a quality of service (QoS) in the first preset time period.

According to a second aspect, a channel access period allocation apparatus is provided. The apparatus may be an access point (AP) and may include a processor and a non-transitory computer readable storage medium storing instructions that are executable by the processor. The instructions may be executed by the processor to: receive first information sent by a first station (STA), where the first information is used by the first STA to request a dynamic service period (DSP) from the AP; and send second information to the first STA, where the second information is used to instruct the first STA to send a data frame to the AP in a first DSP, where a start time of the first DSP falls within a first preset time period following an end time of a service period (SP) of the first STA, and the first DSP requested by the first STA is pre-allocated to a second STA having a priority that is lower than that of the first STA, where a time delay of the first STA for sending the data frame satisfies a time delay requirement of a quality of service QoS in the first preset time period.

According to a third aspect, a channel access period allocation apparatus is provided. The apparatus may be a first station (STA) and may include a processor and a non-transitory computer readable storage medium storing instructions that are executable by the processor. The instructions may be executed by the processor to: send first information to an access point (AP), where the first information is used by the first STA to request a dynamic service period (DSP) from the AP; and receive second information sent by the AP, where the second information is used to instruct the first STA to send a data frame to the AP in a first DSP, where a start time of the first DSP falls within a first preset time period following an end time of a service period (SP) of the first STA, and the first DSP requested by the first STA is pre-allocated to a second STA having a priority that is lower than that of the first STA, where a time delay of the first STA for sending the data frame to the AP satisfies a time delay requirement of a quality of service (QoS) in the first preset time period; and send the data frame to the AP in the first DSP.

It is to be understood that both the foregoing general description and the following detailed description are exemplary and explanatory only and are not restrictive of the disclosure.

BRIEF DESCRIPTION OF DRAWINGS

To describe the technical solutions in the examples of the present disclosure, the following briefly describes the accompanying drawings for describing the examples. Apparently, the accompanying drawings in the following description show some examples of the present disclosure, and persons of ordinary skill in the art may still derive other drawings from these accompanying drawings without creative efforts.

DETAILED DESCRIPTION

To make the objectives, technical solutions, and advantages of the examples of the present disclosure clearer, the following clearly describes the technical solutions in the examples of the present disclosure with reference to the accompanying drawings in the examples of the present disclosure. Apparently, the described examples are some but not all of the examples of the present disclosure. All other examples obtained by persons of ordinary skill in the art based on the examples of the present disclosure without creative efforts shall fall within the protection scope of the present disclosure.

Sometimes, the access point (AP) may divide a channel access period into a service period (SP) and a contention-based access period (CBAP); and the SP is divided into a determined SP and a shared SP. The determined SP is allocated to a specific station (STA), that is, each determined SP is uniquely corresponding to a STA that has access permission; in the shared SP, access permission is determined for different STAs by means of scheduling by the AP; and in the CBAP, access permission is determined for different STAs by means of contention. When a STA needs to transmit a data frame to an AP, the STA first transmits the data frame in a determined SP corresponding to the STA; when the data frame transmission is not completed in the determined SP, the STA may further obtain access permission in a shared SP and a CBAP to access the AP, and send the data frame to the AP.

However, according to some methods, time intervals between a determined SP, and a shared SP and a CBAP may be relatively large; therefore, a delay of a data frame in a STA with a relatively high priority cannot satisfy a delay quality of service (QoS) requirement.

Figure 1:
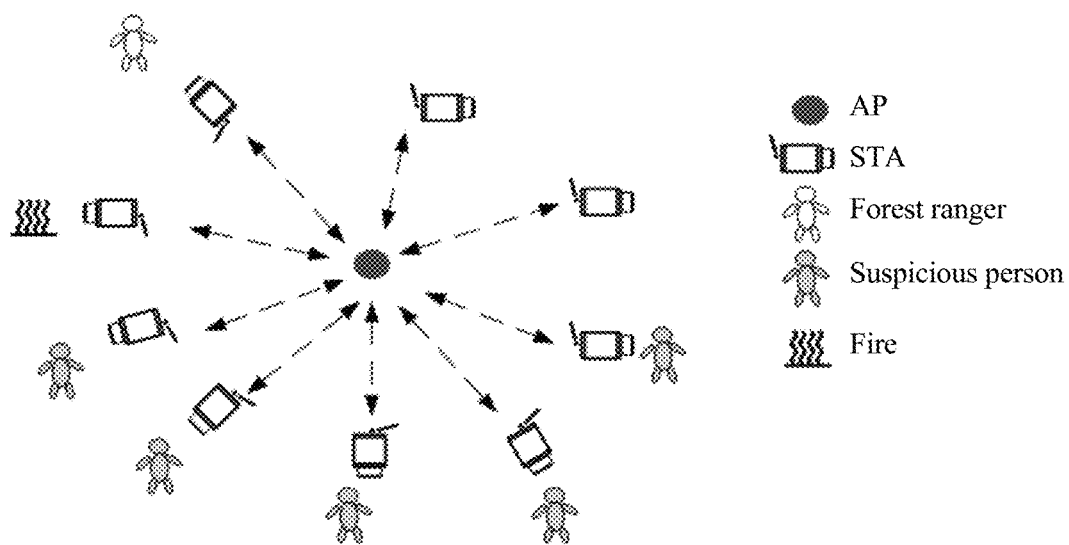
FIG. 1 is a schematic diagram of a system architecture of a VPAN.

FIG. 1 is a schematic diagram of a system architecture of a VPAN. As shown in FIG. 1, a VPAN network includes an AP and a STA. The AP is a management device of the VPAN, and the STA is a video monitoring device of the VPAN (for example, monitoring whether there is a suspicious person or whether there is danger of fire).

Figure 2:
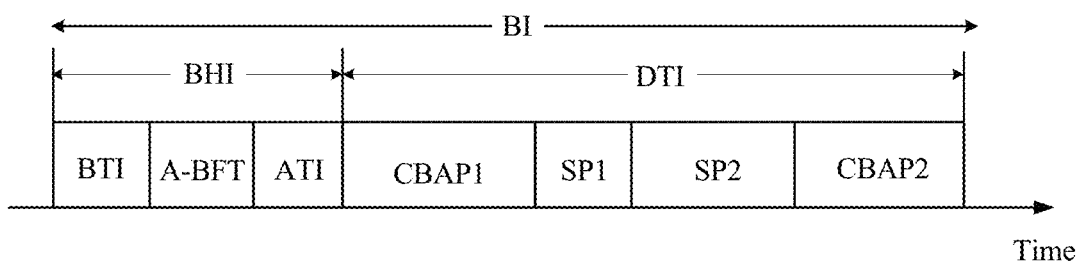
FIG. 2 is a schematic diagram of allocation of an access period in a beacon interval.

In the VPAN, time is generally divided into time intervals that use a beacon interval (BI,) as a period. Each BI includes some channel access periods. FIG. 2 is a schematic diagram of allocation of an access period in a beacon interval. A beacon transmission interval (BTI) is a beacon frame transmission period; association beamforming training (A-BFT) is a beamforming training period; an announcement transmission interval (ATI) is a request/acknowledgement-based polling management access period between an AP and a STA; and a data transfer interval (DTI) is a data transmission period, and the DTI is divided into CBAP and SP periods of any combination by means of scheduling by an AP. The AP may notify a STA of allocation information of the DTI by sending an extended schedule element in a beacon frame or an announcement frame.

Sometimes, allocation types of an SP may be classified into two types: determined allocation (a corresponding SP is a determined SP) and shared allocation (a corresponding SP is a shared SP). For example, if a source association identifier (AID) of an SP 1 is an AID of a STA 1, and a destination AID of the SP 1 is an AID of an AP, an allocation type of the SP 1 may be considered as determined allocation; and if both a source AID and a destination AID of an SP 2 are broadcast AIDs, an allocation type of the SP 2 may be considered as shared allocation. For the SP 1, the STA 1 may send data to the AP at a start time of the SP 1, and the SP 1 is a determined SP allocated by the AP to the STA 1. For the SP 2, the AP polls a communication requirement of each STA in a polling period (PP) at a start of the SP 2, and then allocates the SP 2 in a grant period (GP) of the SP 2. A STA that obtains the SP 2 allocated by the AP can access a channel in the SP 2.

Generally, in the VPAN, the AP needs to allocate an SP (that is, a determined SP) to each STA in an uplink direction to the AP, so that each STA can send a video data frame collected by each STA to the AP, and then the AP may allocate a shared SP and/or a CBAP in a remaining period of the DTI. When load of the VPAN is close to saturation, channel time resources that can be used as a shared SP and a CBAP are limited. Time intervals between a determined SP, and a shared SP and a CBAP may be relatively large; therefore, a delay of a data frame in a STA with a relatively high priority cannot satisfy a delay QoS requirement. For the STA with a relatively high priority, the data frame should not have an excessively large delay. It needs to be ensured that the data frame in the STA with a relatively high priority can be preferentially sent to the AP.

It should be noted that, that the load of the VPAN is close to saturation means that, compared with bandwidth required in a typical application scenario, a bandwidth margin of maximum bandwidth provided in the VPAN is relatively small.

Figure 3:
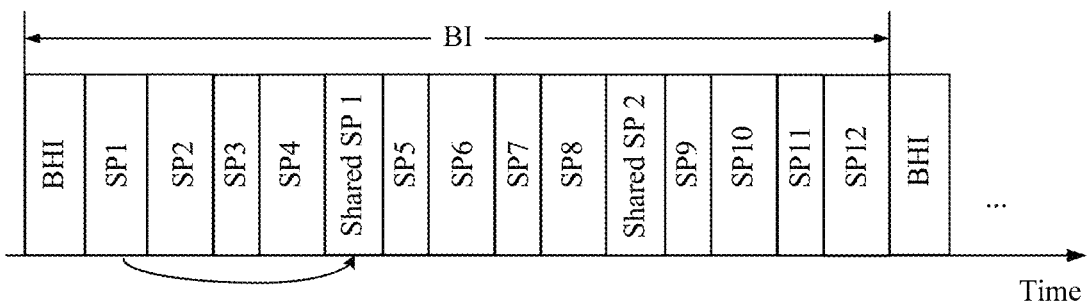
FIG. 3 is a schematic diagram of data frame transmission scheduling.

For example, FIG. 3 is a schematic diagram of data frame transmission scheduling. As shown in FIG. 3, an SP 1 is allocated by an AP to a STA 1 for sending a data frame to the AP, an SP 2 is allocated by the AP to a STA 2 for sending a data frame to the AP, . . . , and an SP 12 is allocated by the AP to a STA 12 for sending a data frame to the AP, and a remaining period is divided into two shared SPs. If a data rate of the STA 1 significantly changes (for example, when the STA 1 uses a variable bit rate (VBR) for coding, magnitudes of a frame I and a frame B that are obtained after coding dynamically change as a monitored scenario changes; therefore, the data rate significantly changes when the STA 1 uses the VBR for coding), a problem that the SP 1 cannot satisfy transmission of data frames that are increased due to the increased data rate of the STA 1 occurs. In this case, the STA 1 can only send a data frame to the AP again in a shared SP 1 following the SP 1. If a time interval between the SP 1 and the shared SP 1 is relatively large, delay QoS requirement of the data frame in the STA 1 cannot be satisfied, and a priority of the STA 1 is relatively high. Therefore, a problem that a delay of a data frame in a STA with a relatively high priority cannot satisfy a delay quality of service QoS requirement is caused.

It should be noted that the AP in the present disclosure may distinguish priorities of STAs according to importance of areas monitored by the STA. A higher priority of a STA indicates a more important area monitored by the STA. Related factors of importance of a monitored area may include: whether an important event occurs in the monitored area, whether the monitored area is magnified by a user for displaying, and the like.

It should be noted that there is no communication between STAs in the VPAN. Therefore, communication between an AP and a STA is mainly considered in the present disclosure.

An SP allocated to a STA should be understood as an SP that is used by the STA to send a data frame to the AP.

Figure 4:
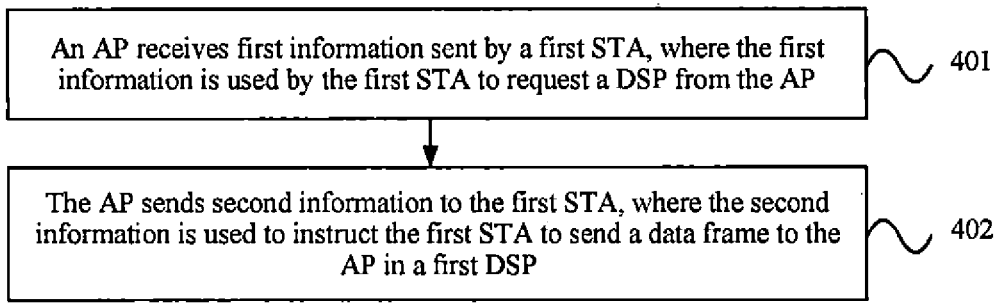
FIG. 4 is a flowchart of Example 1 of a channel access period allocation method according to the present disclosure.

FIG. 4 is a flowchart of Example 1 of a channel access period allocation method according to the present disclosure. As shown in FIG. 4, the method in this example may include:

Step 401: An AP receives first information sent by a first STA, where the first information is used by the first STA to request a dynamic service period (DSP) from the AP.

Step 402: The AP sends second information to the first STA, where the second information is used to instruct the first STA to send a data frame to the AP in a first DSP.

A start time of the first DSP falls within a first preset time period following an end time of an SP of the first STA. The first DSP is pre-allocated to a second STA whose priority is lower than a priority of the first STA. A delay of the first STA satisfies a delay quality of service QoS requirement in the first preset time period.

Sometimes, when a STA 1 does not complete data frame transmission in an SP allocated to the STA 1, the STA 1 needs to wait for a following shared SP (or CBAP) and then can send a data frame by using the shared SP (or CBAP). In the present disclosure, an AP receives first information sent by a first station STA, where the first information is used by the first STA to request a DSP from the AP; the AP sends second information to the first STA, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period.

Sometimes, when the STA 1 does not complete data frame transmission in the SP allocated to the STA 1, the STA 1 needs to wait for the following shared SP (or CBAP) and then can send the data frame by using the shared SP (or CBAP). Therefore, when time intervals between an SP of a STA 1 with a relatively high priority, and a shared SP and a CBAP are relatively large, a problem that a delay of a data frame in the STA with a relatively high priority cannot satisfy a delay QoS requirement exists.

In this example, an AP receives first information sent by a first station STA, where the first information is used by the first STA to request a DSP from the AP; the AP sends second information to the first STA, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period. In this way, a STA with a higher priority can occupy a DSP that falls within a first preset time period following an end time of an SP of the STA and that is of a STA with a lower priority, to send a data frame to the AP, and a delay of the data frame in the STA with a higher priority can satisfy a delay QoS requirement.

It should be noted that, for a CBAP, a problem of a collision between STAs due to contention occurs, and in particular, a probability of a collision between high-priority STAs that have the same priority is relatively large. Compared with the CBAP, for a DSP allocated by the AP in the present disclosure, a problem of the collision between STAs does not occur.

Figure 5:
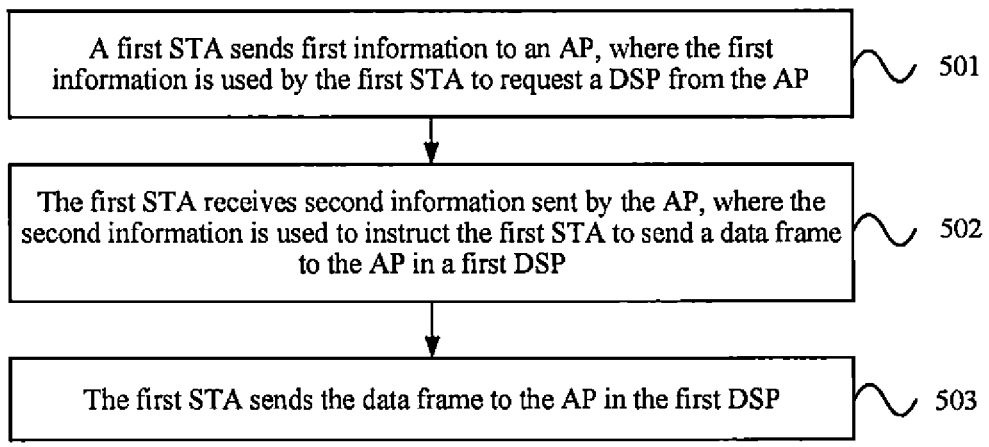
FIG. 5 is a flowchart of Example 2 of a channel access period allocation method according to the present disclosure.

FIG. 5 is a flowchart of Example 2 of a channel access period allocation method according to the present disclosure. As shown in FIG. 5, the method in this example may include the following steps.

Step 501: A first STA sends first information to an AP, where the first information is used by the first STA to request a DSP from the AP.

Step 502: The first STA receives second information sent by the AP, where the second information is used to instruct the first STA to send a data frame to the AP in a first DSP.

A start time of the first DSP falls within a first preset time period following an end time of an SP of the first STA. The first DSP is pre-allocated to a second STA whose priority is lower than a priority of the first STA. A delay of the first STA satisfies a delay quality of service QoS requirement in the first preset time period.

Step 503: The first STA sends the data frame to the AP in the first DSP.

In this example, a first STA sends first information to an AP, where the first information is used by the first STA to request a DSP from the AP; the first STA receives second information sent by the AP, where the second information is used to instruct the first STA to send a data frame to the AP in a first DSP, a start time of the first DSP falls within a first preset time period following an end time of an SP of the first STA, the first DSP is pre-allocated to a second STA whose priority is lower than a priority of the first STA, and a delay of the first STA satisfies a delay quality of service QoS requirement in the first preset time period; the first STA sends the data frame to the AP in the first DSP. In this way, a STA with a higher priority can occupy a DSP that falls within a first preset time period following an end time of an SP of the STA and that is of a STA with a lower priority, to send a data frame to the AP, and a delay of the data frame in the STA with a higher priority can satisfy a delay QoS requirement.

Figure 6:
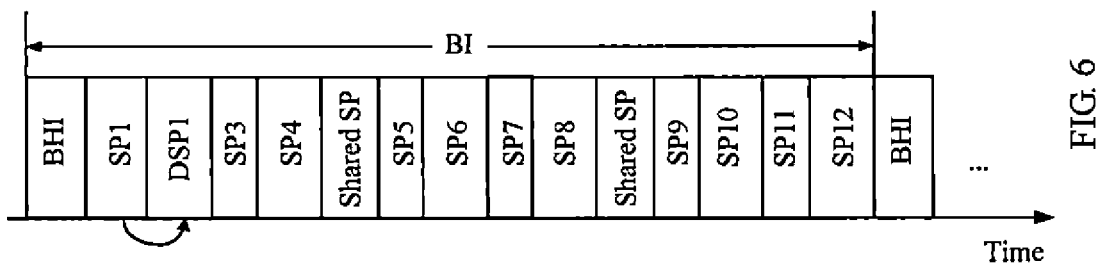
FIG. 6 is a schematic diagram of data frame transmission scheduling according to the present disclosure.

For example, FIG. 6 is a schematic diagram of data frame transmission scheduling in the present disclosure. As shown in FIG. 6, an SP 1 is allocated by an AP to a STA 1 for sending a data frame to the AP, a DSP 1 is allocated by the AP to a STA 2 for sending a data frame to the AP, . . . , and an SP 12 is allocated by the AP to a STA 12 for sending a data frame to the AP, and a remaining period is divided into two shared SPs. If a data rate of the STA 1 significantly changes, a problem that the SP 1 cannot satisfy transmission of data frames that are increased due to the increased data rate of the STA 1 occurs. In this case, the AP may instruct the STA 1 to send a data frame to the AP by using the DSP 1 of the STA 2 after the SP 1, so that a delay of the data frame in the STA 1 can satisfy a delay QoS requirement.

Figure 7:
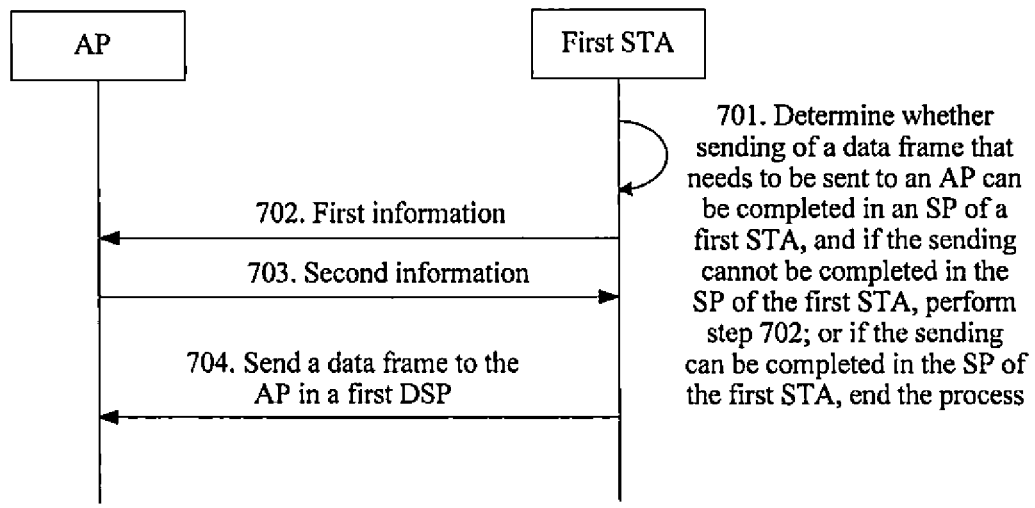
FIG. 7 is a flowchart of Example 3 of a channel access period allocation method according to the present disclosure.

FIG. 7 is a flowchart of Example 3 of a channel access period allocation method according to the present disclosure. As shown in FIG. 7, the method in this example may include the following steps.

Step 701: A first STA determines whether sending of a data frame that needs to be sent to an AP can be completed in an SP of the first STA; and if the sending cannot be completed in the SP of the first STA, step 702 is performed; or if the sending can be completed in the SP of the first STA, the process ends.

Step 702: The first STA sends first information to the AP, where the first information is used by the first STA to request a DSP from the AP.

Optionally, the first information may be indicated by using an SP request frame, or indicated by using a QoS control field in a data frame.

Optionally, when the first information is indicated by using the SP request frame, the first STA may separately send the SP request frame in the SP of the first STA; or the first STA may aggregate the SP request frame and the last data frame sent by the first STA in the SP of the first STA, and send an aggregated frame to the AP.

Optionally, when the first information is indicated by using the SP request frame, the first STA may request the DSP from the AP by adding a DSP request field to a dynamic allocation information field in the SP request frame.

For example, a format of the dynamic allocation information field in the SP request frame may be shown in Table 1.

TABLE 1

| Bit | B0-B3 | B4-B6 | B7-B21 | B22-B23 |
|---|---|---|---|---|
| Field | TID | Allocation type | Allocation duration | DSP request |

It should be noted that TID is an English acronym for traffic identifier.

It should be noted that other fields other than the DSP request field in Table 1 are not described in detail herein.

Optionally, that the first information is indicated by using a QoS control field in a data frame specifically includes: The first STA may request the DSP from the AP by adding a DSP request field to the QoS control field included in a Media Access Control (MAC) frame header of the data frame.

For example, a format of the QoS control field may be shown in Table 2.

TABLE 2

| | Bit | | | | | |
|---|---|---|---|---|---|---|
| | B0-B2 | B3 | B4-B5 | B6 | B7-B8 | B9-B15 |
| Field | TID | Requirement type | ACK policy | A-MSDU present | DSP request | Queue size/ Requested TXOP duration |

It should be noted that ACK is an English abbreviation of acknowledge (acknowledge), A-MSDU is an English acronym for aggregated MAC service data unit, and TXOP is an English acronym for transmission opportunity.

It should be noted that other fields other than the DSP request field in Table 2 are not described in detail herein.

Optionally, the first STA may request the DSP from the AP by setting the DSP request field to non-zero. When the DSP request field is 0, it indicates that the first STA does not request the DSP.

Step 703: The AP sends second information to the first STA, where the second information is used to instruct the first STA to send a data frame to the AP in a first DSP.

A start time of the first DSP falls within a first preset time period following an end time of the service period SP of the first STA. The first DSP is pre-allocated to a second STA whose priority is lower than a priority of the first STA. A delay of the first STA satisfies a delay quality of service QoS requirement in the first preset time period.

Optionally, the second information may be indicated by using a grant frame.

Figure 8:
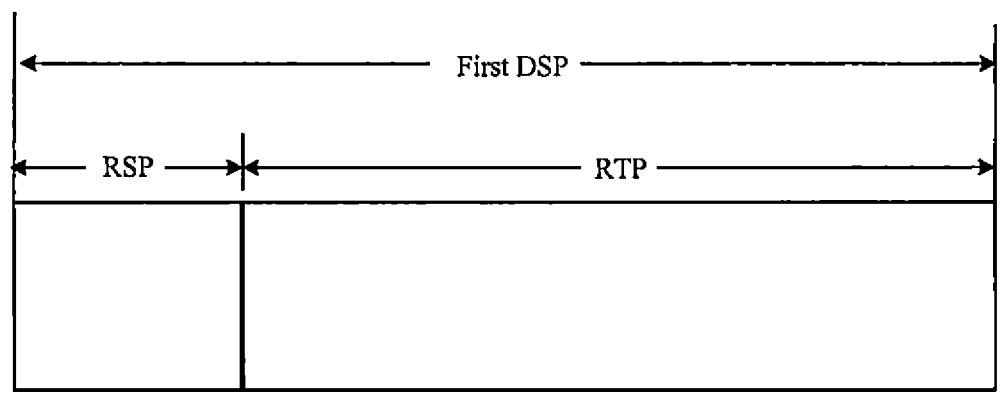
FIG. 8 is a schematic structural diagram of composition of a first DSP according to the present disclosure.

Optionally, the first DSP includes a first sub-DSP and a second sub-DSP, and the first sub-DSP is before the second sub-DSP. FIG. 8 is a schematic structural diagram of composition of a first DSP according to the present disclosure. As shown in FIG. 8, the first sub-DSP may be considered as a realtime schedule period (RSP) in FIG. 8, and the second sub-DSP may be considered as a realtime transmit period RTP in FIG. 8. The RSP may be used by the AP to authorize a STA that can send a data frame in the DSP to which the RSP belongs, and the RTP may be used by the authorized STA to send a data frame to the AP.

Correspondingly, step 703 may specifically include:

sending, by the AP, the second information to the first STA in the first sub-DSP, where the second information is used to instruct the first STA to send the data frame to the AP in the second sub-DSP.

Optionally, the AP may further send the second information to the second STA, so that the second STA enters a sleep mode in the second sub-DSP. That is, after the second STA receives an instruction that instructs the first STA to send the data frame to the AP in the second sub-DSP, the second STA determines that the second STA cannot send a data frame to the AP in the second sub-DSP. The second STA enters a sleep mode in the second sub-DSP, so as to save energy.

It should be noted that the AP may send the second information to the first STA and the second STA at the same time by using a broadcast message.

Optionally, before step 703, the method may further include: sending, by the AP, active instruction information to the first STA, where the active instruction information is used to instruct the first STA to remain active in the first DSP.

The active instruction information may be a flag bit. When the flag bit is non-zero, it is used to instruct to remain active; or when the flag bit is 0, it is used to instruct to remain in a sleep mode. For example, when the active instruction information is used to instruct the first STA to remain active in the first DSP, the flag bit is non-zero.

Optionally, the active instruction information may further indicate duration in which the first STA remains active. For example, the active instruction information instructs the first STA to remain active in all DSPs in a current BI or in duration of multiple BIs starting from a current BI.

Further, optionally, the AP may set, by using a value of the flag bit, the duration in which the first STA remains active. For example, when the flag bit is 2, it indicates that the first STA remains active in duration of two BIs. The AP specifies the duration in which the first STA remains active, so that the first STA can accurately remain active in a subsequent DSP, so as to occupy an available DSP of the first STA to obtain an extra sending opportunity.

Optionally, the active instruction information may be indicated by using an ACK frame or a MAC frame header of a block ACK frame that is returned by the AP to the first STA (for example, an active indication field is added to a frame control field in the MAC frame header).

For example, a format of the frame control field may be shown in Table 3.

TABLE 3

| | Bit | | | | | | | | |
|---|---|---|---|---|---|---|---|---|---|
| | B0-B1 | B2-B3 | B4-B7 | B8-B9 | B10 | B11-B12 | B13 | B14 | B15 |
| Field | Protocol version | Type | Sub-type | Bandwidth indication | Dynamic indication | Active indication | Power consumption management | More data | Protected frame |

It should be noted that other fields other than the active indication field in Table 3 are not described in detail herein.

Optionally, before step 703, the method may further include:

sending, by the AP, third information to the first STA at a start time of the first sub-DSP, where the third information is used by the AP to perform coding control and/or lens control on the first STA.

Optionally, when the third information is used by the AP to perform coding control on the first STA, the third information may include a related parameter, such as a coding scheme, required when the first STA performs coding.

When the third information is used by the AP to perform lens control on the first STA, the third information may include a related parameter of a lens of the first STA, such as a lens angle and a focal length.

Optionally, the third information may be indicated by using a short control management frame.

It should be noted that, because a data amount of the short control management frame sent by the AP to the STA is small, and a realtime requirement usually is high, a priority of the AP may be set to be higher than a priority of another STA, that is, the AP may occupy the DSP before the STA, to send a data frame to the STA (for example, the AP sends the short control management frame to the STA at a start of the first sub-DSP).

Optionally, when multiple STAs send DSP requests to the AP, the AP may allocate, according to priorities of the multiple STAs, DSPs to the multiple STAs successively in descending order of the priorities, so that the multiple STAs may send data frames to the AP by using the DSPs (for example, the first DSP).

Further, optionally, when sending the DSP requests to the AP, the multiple STAs may further send communication requirements to the AP, and the communication requirement is used to indicate duration of a DSP requested by a STA. The AP may allocate a DSP with appropriate duration to a STA according to a communication requirement of the STA.

For example, when the first information is indicated by using an SP request frame, further, the communication requirement may be indicated by using an allocation duration sub-field in a dynamic allocation information field in the SP request frame (as shown in Table 1). When the first information is indicated by using a QoS control field included in a MAC frame header of a data frame in the first STA, further, the communication requirement may be indicated by using a queue size sub-field or a requested TXOP duration sub-field in the QoS control field (as shown in Table 2).

Step 704: The first STA sends the data frame to the AP in the first DSP.

Optionally, step 704 may specifically include: the first STA sends the data frame to the AP in the second sub-DSP.

In this example, when determining that sending of a data frame that needs to be sent to an AP cannot be completed in an SP that is allocated by the AP to a first STA, the first STA requests a DSP from the AP; the AP allocates a first DSP to the first STA; a start time of the first DSP falls within a first preset time period following an end time of the service period SP of the first STA; the first DSP is pre-allocated to a second STA whose priority is lower than a priority of the first STA; and a delay of the first STA satisfies a delay quality of service QoS requirement in the first preset time period. In this way, the first STA can occupy a DSP that falls within the first preset time period following the end time of the SP of the first STA and that is of the second STA whose priority is lower than the priority of the first STA, to send a data frame to the AP.

It should be noted that a higher priority of a STA indicates a higher priority of a data frame in the STA. Therefore, in this example, the AP may use a priority of a STA as a priority of a data frame in the STA.

Figure 9:
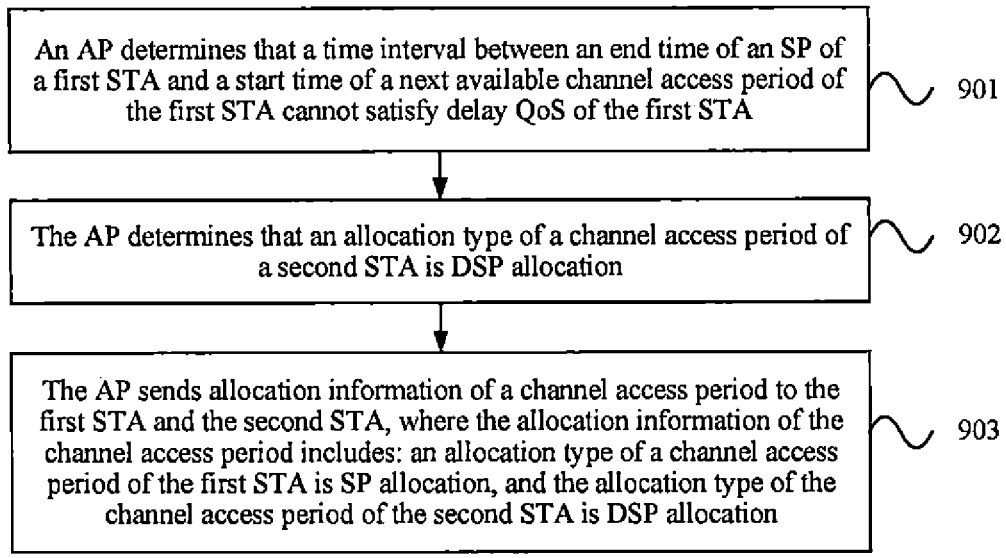
FIG. 9 is a flowchart of Example 4 of a channel access period allocation method according to the present disclosure.

FIG. 9 is a flowchart of Example 4 of a channel access period allocation method according to the present disclosure. As shown in FIG. 9, before step 401, the method may further include:

Step 901: An AP determines that a time interval between an end time of an SP of a first STA and a start time of a next available channel access period of the first STA cannot satisfy delay QoS requirement of the first STA.

It should be noted that step 901 may be considered as a trigger condition used to trigger the AP to set an allocation type of a channel access period of a second STA to DSP allocation. Step 901 is an optional step. When step 901 is not included, a channel access period whose allocation type is DSP allocation may be allocated to the second STA by default; or when step 901 is included, and a delay of the first STA may not satisfy a QoS requirement, a channel access period whose allocation type is DSP allocation is allocated to the second STA.

Optionally, the AP may obtain the delay QoS requirement of the first STA by using a delay threshold field included in a traffic specification (TSPEC) element sent from the first STA.

It should be noted that, when step 901 is not included in this example, and a VPAN includes M high-priority stations and N low-priority stations (related descriptions about a high-priority STA and a low-priority STA are the same as those in step 902), a method for determining, by the AP, STAs to which a channel access period whose allocation type is DSP allocation is allocated and STAs to which a channel access period whose allocation type is SP allocation is allocated may be as follows:

Scenario 1: M is greater than N. The AP may select N high-priority STAs from the M high-priority STAs in descending order of priorities, or the AP may select, from M high-priority STAs, N STAs with a high probability that a data amount increases. The AP allocates N DSPs to the N selected STAs respectively, where the N DSPs respectively follow SPs of the N STAs and are respectively adjacent to the SPs of the N STAs, so that when any STA in the N STAs cannot satisfy, in an SP of the STA, a communication requirement, the STA may continue to access a channel in a DSP adjacent to the SP in the following, so as to preferentially ensure transmission of a data frame in a high-priority station.

Scenario 2: N is greater than or equal to M. The AP may select M low-priority STAs from the N low-priority STAs in ascending order of priorities, or the AP may select M low-priority STAs from the N low-priority STAs in ascending order of delays. The AP allocates DSPs of the M selected STAs to the M high-priority STAs respectively, where the DSPs of the M selected STAs respectively follow SPs of the M high-priority STAs and are respectively adjacent to the SPs of the M high-priority STAs.

It should be noted that, because a DSP causes extra overheads for sending second information by the AP, the AP may achieve a tradeoff between reducing a delay of a data frame in a high-priority STA and having a large quantity of extra overheads due to excessive DSPs, and allocate an appropriate quantity of DSPs.

Step 902: The AP determines that an allocation type of a channel access period of a second STA is DSP allocation.

It should be noted that a method for determining whether a STA is a high-priority STA or a low-priority STA may include: according to a preset priority threshold, determining a STA whose priority is greater than or equal to the threshold as a high-priority STA, and determining a STA whose priority is lower than the threshold as a low-priority STA.

Step 903: The AP sends allocation information of a channel access period to the first STA and the second STA, where the allocation information of the channel access period includes: an allocation type of a channel access period of the first STA is SP allocation, and the allocation type of the channel access period of the second STA is DSP allocation.

Optionally, the AP may send an extended schedule element in a beacon frame (or an announcement frame), to notify the STA of allocation information of a DTI. It should be noted that an access period includes the DTI.

For example, a format of the extended schedule element may be shown in Table 4.

TABLE 4

| | | Field | | | |
|---|---|---|---|---|---|
| | Element ID | Length | Allocation 1 | Allocation 2 | ... | Allocation n |
| Quantity of bytes | 1 | 1 | 13 | 13 | ... | 13 |

It should be noted that a meaning of each field in Table 4 is not described herein.

For example, a format of the allocation field (for example, allocation 1) in Table 4 may be shown in Table 5.

TABLE 5

| | Field | | | | | | |
|---|---|---|---|---|---|---|---|
| | Allocation control | Source AID | Target AID | Allocation start | Allocation block duration | Quantity of blocks | Allocation block period |
| Quantity of bytes | 2 | 1 | 1 | 4 | 2 | 1 | 2 |

It should be noted that a meaning of each field in Table 5 is not described herein.

For example, a format of the allocation control field in Table 5 may be shown in Table 6.

TABLE 6

| | Bit | | | | | |
|---|---|---|---|---|---|---|
| | B0-B3 | B4-B6 | B7 | B8 | B9 | B10 | B11-B15 |
| Field | Allocation ID | Allocation type | Pseudo-static state | Truncation | Delay | Truncation type | Reservation |

It should be noted that a meaning of each field in Table 6 is not described herein.

Meanings represented by different values of the allocation type field in Table 6 may be, for example, shown in Table 7.

TABLE 7

| B4 | B5 | B6 | Meaning |
|---|---|---|---|
| 0 | 0 | 0 | SP allocation |
| 1 | 0 | 0 | CBAP allocation |
| 0 | 0 | 1 | DSP allocation |
| Another combination | | | Reservation |

It should be noted that, in Table 7, that "000" is used to represent SP allocation, "100" represents CBAP allocation, and "001" represents DSP allocation is merely an example, and a purpose is to use different values to represent different allocation types.

It should be noted that, in the present disclosure, allocation of each field in Table 1 to Table 7 is merely an example.

Optionally, in step 903, the AP may set the allocation type in the allocation control field in the allocation field (for example, allocation 1), in Table 4, corresponding to the first STA to SP allocation, and set the allocation type in the allocation control field in the allocation field (for example, the allocation 2), in Table 4, corresponding to the second STA to DSP allocation, so as to implement the allocation information of the channel access period, which includes: the allocation type of the channel access period of the first STA is SP allocation, and the allocation type of the channel access period of the second STA is DSP allocation In this example, when an AP determines that a time interval between an end time of an SP of a first STA and a start time of a next available channel access period of the first STA cannot satisfy delay QoS requirement of the first STA, the AP determines that an allocation type of a channel access period of a second STA is DSP allocation, and sends allocation information of a channel access period to the first STA and the second STA, so that the AP can appropriately allocate a channel access period according to a transmission requirement of a data frame in the first STA.

Figure 10:
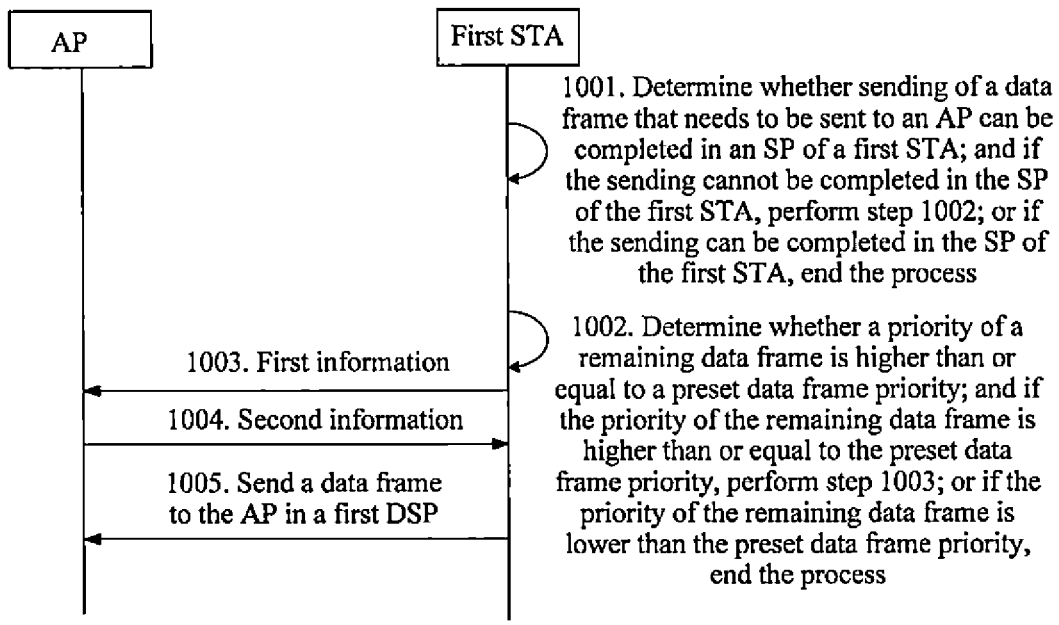
FIG. 10 is a flowchart of Example 5 of a channel access period allocation method according to the present disclosure.

FIG. 10 is a flowchart of Example 5 of a channel access period allocation method according to the present disclosure. As shown in FIG. 10, the method in this example may include the following steps.

Step 1001: A first STA determines whether sending of a data frame that needs to be sent to an AP can be completed in an SP of the first STA; and if the sending cannot be completed in the SP of the first STA, step 1002 is performed; or if the sending can be completed in the SP of the first STA, the process ends.

Step 1002: The first STA determines whether a priority of a remaining data frame is higher than or equal to a preset data frame priority; and if the priority of the remaining data frame is higher than or equal to the preset data frame priority, step 1003 is performed; or if the priority of the remaining data frame is lower than the preset data frame priority, the process ends.

The preset data frame priority is a lowest priority of a data frame that can be sent by occupying a first DSP.

A start time of the first DSP falls within a first preset time period following an end time of the service period SP of the first STA. The first DSP is pre-allocated to a second STA whose priority is lower than a priority of the first STA.

Optionally, the preset data frame priority may be sent to the first STA by using allocation information of the channel access period, that is, the allocation information of the access period may further include the preset data frame priority.

The first STA may determine a priority of a data frame in the first STA according to a priority of the first STA and an event monitored by the first STA. A determining principle may be as follows: a higher priority and a more important monitored event indicate a higher priority of the data frame. The monitored event may be occurrence of fire, finding of a suspicious person, or the like.

The priority of the first STA may be sent by the AP to the first STA.

It should be noted that priorities of all data frames related to videos buffered in the first STA are the same. When a priority of a data frame is updated, the priorities of all the data frames are correspondingly updated.

Step 1003: The first STA sends first information to the AP, where the first information is used by the first STA to request a DSP from the AP.

It should be noted that step 1003 is similar to step 702, and details are not described herein.

Optionally, the first information may include the priority of the data frame in the first STA.

Optionally, that the first information includes the priority of the data frame in the first STA may include: a value of a DSP request field sent by the first STA is used to represent the priority of the data frame.

Optionally, when multiple STAs send DSP requests to the AP, the AP may allocate, according to priorities of data frames in the multiple STAs, DSPs to the multiple STAs successively in descending order of the priorities of the data frames, so that the multiple STAs may send data frames to the AP by using the DSPs (for example, the first DSP).

Step 1004: The AP sends second information to the first STA, where the second information is used to instruct the first STA to send the data frame to the AP in a first DSP.

It should be noted that step 1004 is similar to step 703, and details are not described herein.

Step 1005: The first STA sends the data frame to the AP in the first DSP.

It should be noted that step 1005 is similar to step 704, and details are not described herein.

In this example, when determining that a priority of a remaining data frame is higher than or equal to a preset data frame priority, a first STA sends first information to an AP, where the first information is used by the first STA to request a DSP from the AP. In this way, a STA with a higher priority can occupy a DSP that falls within a first preset time period following an end time of an SP of the STA and that is of a STA with a lower priority, to send a data frame with a higher priority in the STA with a higher priority to the AP, and a delay of the data frame with a higher priority in the STA with a higher priority can satisfy a delay QoS requirement.

Figure 11:
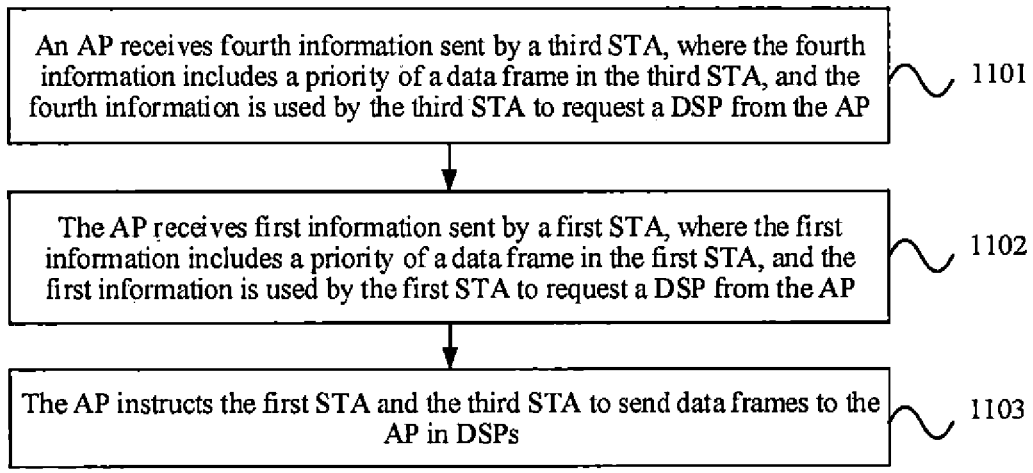
FIG. 11 is a flowchart of Example 6 of a channel access period allocation method according to the present disclosure.

FIG. 11 is a flowchart of Example 6 of a channel access period allocation method according to the present disclosure. As shown in FIG. 11, the method in this example may include:

Step 1101: An AP receives fourth information sent by a third STA, where the fourth information includes a priority of a data frame in the third STA, and the fourth information is used by the third STA to request a DSP from the AP.

Step 1102: The AP receives first information sent by a first STA, where the first information includes a priority of a data frame in the first STA, and the first information is used by the first STA to request a DSP from the AP.

Step 1103: The AP instructs the first STA and the third STA to send data frames to the AP in DSPs.

Optionally, when the priority of the data frame in the first STA is higher than the priority of the data frame in the third STA, the AP first satisfies a DSP requirement of the first STA, and then satisfies a DSP requirement of the third STA. When the priority of the data frame in the first STA is equal to the priority of the data frame in the third STA, the AP may further compare a delay of the first STA and a delay of the third STA. When the delay of the first STA is greater than the delay of the third STA, the AP first satisfies a DSP requirement of the first STA, and then satisfies a DSP requirement of the third STA.

The delay may be an absolute delay, or may be delay weight.

Optionally, when the priority of the data frame in the first STA is higher than the priority of the data frame in the third STA, or when the priority of the data frame in the first STA is equal to the priority of the data frame in the third STA, and the delay of the first STA is greater than the delay of the third STA, step 1103 may specifically include:

sending, by the AP, second information to the first STA, where the second information is used to instruct the first STA to send a data frame to the AP in a first DSP; and sending, by the AP, fifth information to the third STA, where the fifth information is used to instruct the third STA to send a data frame to the AP in a second DSP.

A start time of the first DSP falls within a first preset time period following an end time of a service period SP of the first STA; the first DSP is pre-allocated to a second STA whose priority is lower than a priority of the first STA; and a delay of the first STA satisfies a delay quality of service QoS requirement in the first preset time period. A start time of the second DSP falls within a second preset time period following an end time of an SP of the third STA; the second DSP is pre-allocated to a fourth STA whose priority is lower than a priority of the third STA; and the second preset time period is determined according to a delay that can satisfy delay QoS requirement of the third STA. The first DSP is before the second DSP.

Alternatively, step 1103 may specifically include:

sending, by the AP, second information to the first STA, and sending fifth information to the third STA, where the second information is used to instruct the first STA to send a data frame to the AP in a first time range of the first DSP, and the fifth information is used to instruct the third STA to send a data frame to the AP in a second time range of the first DSP.

The first DSP includes the first time range and the second time range, and the first time range is before the second time range.

It should be noted that, further, in this example, a time for sending a short control management frame in the DSP may be determined by comparing a priority of a data frame in the short control management frame sent by the AP and a priority of a data frame in another high-priority STA.

Generally, the AP can obtain, by means of decoding, a complete image only after receiving all frames buffered in a STA. Therefore, an absolute delay of the STA is obtained by collecting statistics about an average delay of data frames in a transmit buffer and a sending delay of a data frame in the transmit buffer.

Optionally, that the AP obtains a delay of a $STA_i$ may include the following steps:

(1) The $STA_i$ uses the following formula (1) to determine a first absolute delay $Delay(STA_i)$ of the $STA_i$:

$$Delay(STA_i) = \frac{\sum_{n=1}^{NDateFrame(STA_i)} t_{BufferDelay}(n)}{NDateFrame(STA_i)} + Transmittime(NDateFrame(STA_i)) \quad (1)$$

$NDateFrame(STA_i)$ is a quantity of data frames in a transmit buffer of the $STA_i$ when an $SP_i$ ends. The $SP_i$ is owned by the $STA_i$. $t_{BufferDelay}(n)$ is a delay of an $n^{th}$ data frame in $NDateFrame(STA_i)$ data frames in the transmit buffer (that is, a queue time of the $n^{th}$ data frame in the transmit buffer). $Transmittime(NDateFrame(STA_i))$ is a sending delay of the $NDateFrame(STA_i)$ data frames in the $STA_i$ (that is, a time required for completing sending of the $NDateFrame(STA_i)$ data frames).

(2) The $STA_i$ sends the $Delay(STA_i)$ to the AP.

Optionally, the $STA_i$ may indicate the $Delay(STA_i)$ by using an information response frame, and aggregate the information response frame and the last data frame sent in the $SP_i$ and send them to the AP.

(3) The AP uses the following formula (2) according to the $Delay(STA_i)$, to calculate a second delay $Delay'(STA_i)$ of the $STA_i$:

$$Delay'(STA_i) = Delay(STA_i) + T_i \quad (2)$$

$T_i$ is a time interval between a time point at which the AP obtains the $Delay(STA_i)$ and a DSP_1. The DSP_1 is a current to-be-allocated DSP.

(4) The AP uses the following formula (3) according to the $Delay'(STA_i)$, to calculate delay weight $RSWeight(STA_i)$:

$$RSWeight(STA_i) = \frac{Delay'(STA_i)}{Timeout(STA_i) - Delay'(STA_i)} \quad (3)$$

$Timeout(STA_i)$ is a maximum delay allowed by the station $STA_i$.

Optionally, the AP may use the second delay $Delay'(STA_i)$ as a delay of the $STA_i$ in the foregoing delay comparison, or the AP may use the delay weight $RSWeight(STA_i)$ as a delay of the $STA_i$ in the foregoing delay comparison.

Figure 12:
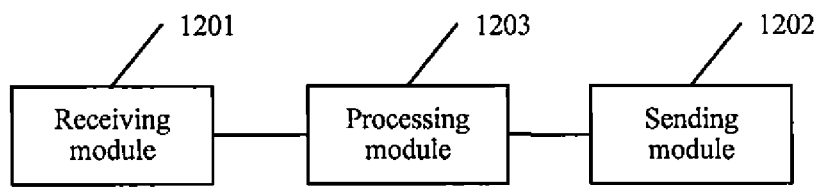
FIG. 12 is a schematic structural diagram of Example 1 of a channel access period allocation apparatus according to the present disclosure.

FIG. 12 is a schematic structural diagram of Example 1 of a channel access period allocation apparatus according to the present disclosure. The apparatus is an AP. As shown in FIG. 12, the apparatus in this example may include a receiving module 1201 and a sending module 1202. The receiving module 1201 is configured to receive first information sent by a first station STA, where the first information is used by the first STA to request a dynamic service period DSP from the AP. The sending module 1202 is configured to send second information to the first STA, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period.

Optionally, the first DSP includes a first sub-DSP and a second sub-DSP, and the first sub-DSP is before the second sub-DSP.

That the sending module 1202 sends second information to the first STA, where the second information is used to instruct the first STA to send a data frame to the AP in the first DSP specifically includes:

sending the second information to the first STA in the first sub-DSP, where the second information is used to instruct the first STA to send the data frame to the AP in the second sub-DSP.

Optionally, the sending module 1202 is further configured to send the second information to the second STA in the first sub-DSP, so that the second STA enters a sleep mode in the second sub-DSP.

Optionally, the sending module 1202 is further configured to send active instruction information to the first STA, where the active instruction information is used to instruct the first STA to remain active in the first DSP.

Optionally, the sending module 1202 is further configured to send third information to the first STA at a start time of the first sub-DSP, where the third information is used by the AP to perform coding control and/or lens control on the first STA.

Optionally, the first information is indicated by using an SP request frame, or is indicated by using a QoS control field in a data frame; and the second information is indicated by using a grant frame.

Optionally, the sending module 1202 is further configured to send allocation information of a channel access period to the first STA and the second STA, where the allocation information of the channel access period includes: an allocation type of a channel access period of the first STA is SP allocation, and an allocation type of a channel access period of the second STA is DSP allocation.

Optionally, the apparatus in this example may further include a processing module 1203, configured to: if determining that a time interval between the end time of the SP of the first STA and a start time of a next available channel access period of the first STA cannot satisfy delay QoS requirement of the first STA, determine that the allocation type of the channel access period of the second STA is DSP allocation.

Optionally, the allocation information of the channel access period further includes a preset data frame priority, and the preset data frame priority is a lowest priority of a data frame that can be sent by occupying the first DSP, so that the first STA determines to send the first information to the AP according to the preset data frame priority.

The first information includes a priority of the data frame in the first STA.

Optionally, the receiving module 1201 is further configured to receive fourth information sent by a third STA, where the fourth information is used by the third STA to request a DSP from the AP.

Manner 1:

The sending module 1202 is further configured to send fifth information to the third STA, where the fifth information is used to instruct the third STA to send a data frame to the AP in a second DSP, a start time of the second DSP falls within a second preset time period following an end time of an SP of the third STA, the second DSP is pre-allocated to a fourth STA whose priority is lower than a priority of the third STA, and the second preset time period is determined according to a delay that can satisfy delay QoS requirement of the third STA.

The first DSP is before the second DSP.

A priority of the data frame in the third STA is lower than the priority of the data frame in the first STA; or the priority of the data frame in the first STA is equal to a priority of the data frame in the third STA, and the delay of the first STA is greater than a delay of the third STA.

Manner 2:

The first DSP includes a first time range and a second time range, and the first time range is before the second time range.

The receiving module 1201 is further configured to receive the fourth information sent by the third STA, where the fourth information is used by the third STA to request the DSP from the AP.

The second information is specifically used to instruct the first STA to send the data frame to the AP in the first time rage of the first DSP.

The sending module 1202 is further configured to send fifth information to the third STA, where the fifth information is used to instruct the third STA to send a data frame to the AP in the second time range of the first DSP.

A priority of the data frame in the third STA is lower than the priority of the data frame in the first STA; or the priority of the data frame in the first STA is equal to a priority of the data frame in the third STA, and the delay of the first STA is greater than a delay of the third STA.

The apparatus in this example may be configured to perform the method examples shown in FIG. 4, FIG. 9, and FIG. 11, and technical solutions on an AP side in the method examples shown in FIG. 7 and FIG. 10. Implementation principles and technical effects thereof are similar and are not described herein.

Figure 13:
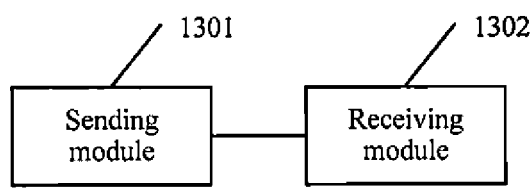
FIG. 13 is a schematic structural diagram of Example 2 of a channel access period allocation apparatus according to the present disclosure.

FIG. 13 is a schematic structural diagram of Example 2 of a channel access period allocation apparatus according to the present disclosure. The apparatus is a first STA. As shown in FIG. 13, the apparatus in this example may include a sending module 1301 and a receiving module 1302. The sending module 1301 is configured to send first information to an access point AP, where the first information is used by the first STA to request a dynamic service period DSP from the AP. The receiving module 1302 is configured to receive second information sent by the AP, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period. The sending module 1301 is further configured to send the data frame to the AP in the first DSP.

Optionally, the first DSP includes a first sub-DSP and a second sub-DSP, and the first sub-DSP is before the second sub-DSP.

The receiving module 1302 is specifically configured to receive the second information sent by the AP in the first sub-DSP.

That the sending module 1301 sends the data frame to the AP in the first DSP specifically includes: sending the data frame to the AP in the second sub-DSP.

Optionally, the receiving module 1302 is further configured to receive active instruction information sent by the AP, where the active instruction information is used to instruct the first STA to remain active in the first DSP.

Optionally, the receiving module 1302 is further configured to receive third information sent by the AP at a start time of the first sub-DSP, where the third information is used by the AP to perform coding control and/or lens control on the first STA.

Optionally, the first information is indicated by using an SP request frame, or is indicated by using a QoS control field in a data frame; and the second information is indicated by using a grant frame.

Optionally, the receiving module 1302 is further configured to receive allocation information of a channel access period sent by the AP, where the allocation information of the channel access period includes: an allocation type of a channel access period of the first STA is SP allocation, and an allocation type of a channel access period of the second STA is DSP allocation.

Optionally, the allocation information of the channel access period further includes a preset data frame priority, and the preset data frame priority is a lowest priority of a data frame that can be sent by occupying the first DSP.

That the sending module 1301 sends first information to the AP specifically includes:

sending the first information to the AP if the first STA determines that a priority of the data frame in the first STA is higher than or equal to the preset data frame priority, where the first information includes the priority of the data frame in the first STA.

The apparatus in this example may be configured to perform the method examples shown in FIG. 5, and technical solutions on a first STA side in the method examples shown in FIG. 7 and FIG. 10. Implementation principles and technical effects thereof are similar and are not described herein.

The present disclosure further provides a channel access period allocation system, including the AP in Example 1 of the channel access period allocation apparatus and the first STA in Example 2 of the channel access period allocation apparatus.

The system in this example may be configured to perform technical solutions of the method examples shown in FIG. 4, FIG. 5, FIG. 7, and FIG. 9 to FIG. 11. Implementation principles and technical effects thereof are similar and are not described herein.

Figure 14:
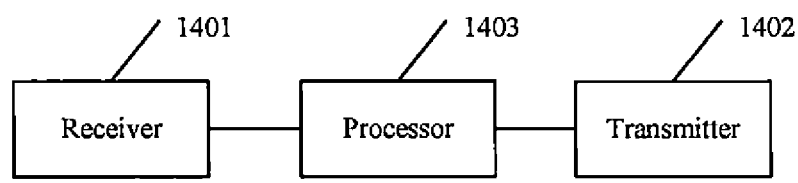
FIG. 14 is a schematic structural diagram of Example 3 of a channel access period allocation apparatus according to the present disclosure.

FIG. 14 is a schematic structural diagram of Example 3 of a channel access period allocation apparatus according to the present disclosure. The apparatus is an AP. As shown in FIG. 14, the apparatus in this example may include a receiver 1401 and a transmitter 1402. The receiver 1401 is configured to receive first information sent by a first station STA, where the first information is used by the first STA to request a dynamic service period DSP from the AP. The transmitter 1402 is configured to send second information to the first STA, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period.

Optionally, the first DSP includes a first sub-DSP and a second sub-DSP, and the first sub-DSP is before the second sub-DSP.

That the transmitter 1402 sends second information to the first STA, where the second information is used to instruct the first STA to send a data frame to the AP in the first DSP specifically includes:

sending the second information to the first STA in the first sub-DSP, where the second information is used to instruct the first STA to send the data frame to the AP in the second sub-DSP.

Optionally, the transmitter 1402 is further configured to send the second information to the second STA in the first sub-DSP, so that the second STA enters a sleep mode in the second sub-DSP.

Optionally, the transmitter 1402 is further configured to send active instruction information to the first STA, where the active instruction information is used to instruct the first STA to remain active in the first DSP.

Optionally, the transmitter 1402 is further configured to send third information to the first STA at a start time of the first sub-DSP, where the third information is used by the AP to perform coding control and/or lens control on the first STA.

Optionally, the first information is indicated by using an SP request frame, or is indicated by using a QoS control field in a data frame; and the second information is indicated by using a grant frame.

Optionally, the transmitter 1402 is further configured to send allocation information of a channel access period to the first STA and the second STA, where the allocation information of the channel access period includes: an allocation type of a channel access period of the first STA is SP allocation, and an allocation type of a channel access period of the second STA is DSP allocation.

Optionally, the apparatus in this example may further include a processor 1403, configured to: if determining that a time interval between the end time of the SP of the first STA and a start time of a next available channel access period of the first STA cannot satisfy delay QoS requirement of the first STA, determine that the allocation type of the channel access period of the second STA is DSP allocation.

Optionally, the allocation information of the channel access period further includes a preset data frame priority, and the preset data frame priority is a lowest priority of a data frame that can be sent by occupying the first DSP, so that the first STA determines to send the first information to the AP according to the preset data frame priority.

The first information includes a priority of the data frame in the first STA.

Optionally, the receiver 1401 is further configured to receive fourth information sent by a third STA, where the fourth information is used by the third STA to request a DSP from the AP.

Manner 1:

The transmitter 1402 is further configured to send fifth information to the third STA, where the fifth information is used to instruct the third STA to send a data frame to the AP in a second DSP, a start time of the second DSP falls within a second preset time period following an end time of an SP of the third STA, the second DSP is pre-allocated to a fourth STA whose priority is lower than a priority of the third STA, and the second preset time period is determined according to a delay that can satisfy delay QoS requirement of the third STA.

The first DSP is before the second DSP.

A priority of the data frame in the third STA is lower than the priority of the data frame in the first STA; or the priority of the data frame in the first STA is equal to a priority of the data frame in the third STA, and the delay of the first STA is greater than a delay of the third STA.

Manner 2:

The first DSP includes a first time range and a second time range, and the first time range is before the second time range.

The receiver 1401 is further configured to receive the fourth information sent by the third STA, where the fourth information is used by the third STA to request the DSP from the AP.

The second information is specifically used to instruct the first STA to send the data frame to the AP in the first time rage of the first DSP.

The transmitter 1402 is further configured to send fifth information to the third STA, where the fifth information is used to instruct the third STA to send a data frame to the AP in the second time range of the first DSP.

A priority of the data frame in the third STA is lower than the priority of the data frame in the first STA; or the priority of the data frame in the first STA is equal to a priority of the data frame in the third STA, and the delay of the first STA is greater than a delay of the third STA.

The apparatus in this example may be configured to perform the method examples shown in FIG. 4, FIG. 9, and FIG. 11, and technical solutions on an AP side in the method examples shown in FIG. 7 and FIG. 10. Implementation principles and technical effects thereof are similar and are not described herein.

Figure 15:
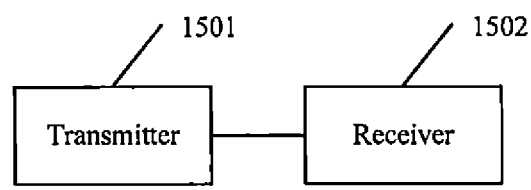

FIG. 15 is a schematic structural diagram of Example 2 of a channel access period allocation apparatus according to the present disclosure. The apparatus is a first STA. As shown in FIG. 15, the apparatus in this example may include a transmitter 1501 and a receiver 1502. The transmitter 1501 is configured to send first information to an access point AP, where the first information is used by the first STA to request a dynamic service period DSP from the AP. The receiver 1502 is configured to receive second information sent by the AP, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period. The transmitter 1501 is further configured to send the data frame to the AP in the first DSP.

Optionally, the first DSP includes a first sub-DSP and a second sub-DSP, and the first sub-DSP is before the second sub-DSP.

The receiver 1502 is specifically configured to receive the second information sent by the AP in the first sub-DSP.

That the transmitter 1501 sends the data frame to the AP in the first DSP specifically includes: sending the data frame to the AP in the second sub-DSP.

Optionally, the receiver 1502 is further configured to receive active instruction information sent by the AP, where the active instruction information is used to instruct the first STA to remain active in the first DSP.

Optionally, the receiver 1502 is further configured to receive third information sent by the AP at a start time of the first sub-DSP, where the third information is used by the AP to perform coding control and/or lens control on the first STA.

Optionally, the first information is indicated by using an SP request frame, or is indicated by using a QoS control field in a data frame; and the second information is indicated by using a grant frame.

Optionally, the receiver 1502 is further configured to receive allocation information of a channel access period sent by the AP, where the allocation information of the channel access period includes: an allocation type of a channel access period of the first STA is SP allocation, and an allocation type of a channel access period of the second STA is DSP allocation.

Optionally, the allocation information of the channel access period further includes a preset data frame priority, and the preset data frame priority is a lowest priority of a data frame that can be sent by occupying the first DSP.

That the transmitter 1501 sends first information to the AP specifically includes:

sending the first information to the AP if the first STA determines that a priority of the data frame in the first STA is higher than or equal to the preset data frame priority, where the first information includes the priority of the data frame in the first STA.

The apparatus in this example may be configured to perform the method examples shown in FIG. 5, and technical solutions on a first STA side in the method examples shown in FIG. 7 and FIG. 10. Implementation principles and technical effects thereof are similar and are not described herein.

Examples of the present disclosure provide a channel access period allocation method, apparatus, and system.

According to a first aspect, an example of the present disclosure provides a channel access period allocation method, including:

receiving, by an access point AP, first information sent by a first station STA, where the first information is used by the first STA to request a dynamic service period DSP from the AP; and sending, by the AP, second information to the first STA, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period.

With reference to the first aspect, in a first possible implementation of the first aspect, the first DSP includes a first sub-DSP and a second sub-DSP, and the first sub-DSP is before the second sub-DSP; and the sending, by the AP, second information to the first STA includes:

sending, by the AP, the second information to the first STA in the first sub-DSP, where the second information is used to instruct the first STA to send the data frame to the AP in the second sub-DSP.

With reference to the first possible implementation of the first aspect, in a second possible implementation of the first aspect, the method further includes:

sending, by the AP, the second information to the second STA in the first sub-DSP, so that the second STA enters a sleep mode in the second sub-DSP.

With reference to any one of the first aspect, or the first or the second possible implementation of the first aspect, in a third possible implementation of the first aspect, before the sending, by the AP, second information to the first STA, the method further includes:

sending, by the AP, active instruction information to the first STA, where the active instruction information is used to instruct the first STA to remain active in the first DSP.

With reference to the first or the second possible implementation of the first aspect, in a fourth possible implementation of the first aspect, before the sending, by the AP, the second information to the first STA in the first sub-DSP, the method further includes:

sending, by the AP, third information to the first STA at a start time of the first sub-DSP, where the third information is used by the AP to perform coding control and/or lens control on the first STA.

With reference to any one of the first aspect, or the first to the fourth possible implementations of the first aspect, in a fifth possible implementation of the first aspect, the first information is indicated by using an SP request frame, or is indicated by using a QoS control field in a data frame, and the second information is indicated by using a grant frame.

With reference to any one of the first aspect, or the first to the fifth possible implementations of the first aspect, in a sixth possible implementation of the first aspect, before the receiving, by an AP, first information sent by a first STA, the method further includes:

sending, by the AP, allocation information of a channel access period to the first STA and the second STA, where the allocation information of the channel access period includes: an allocation type of a channel access period of the first STA is SP allocation, and an allocation type of a channel access period of the second STA is DSP allocation.

With reference to the sixth possible implementation of the first aspect, in a seventh possible implementation of the first aspect, before the sending, by the AP, allocation information of a channel access period to the first STA and the second STA, the method further includes:

if the AP determines that a time interval between the end time of the SP of the first STA and a start time of a next available channel access period of the first STA cannot satisfy delay QoS requirement of the first STA, determining, by the AP, that the allocation type of the channel access period of the second STA is DSP allocation.

With reference to the sixth or the seventh possible implementation of the first aspect, in an eighth possible implementation of the first aspect, the allocation information of the channel access period further includes a preset data frame priority, and the preset data frame priority is a lowest priority of a data frame that can be sent by occupying the first DSP, so that the first STA determines to send the first information to the AP according to the preset data frame priority; and the first information includes a priority of the data frame in the first STA.

With reference to the eighth possible implementation of the first aspect, in a ninth possible implementation of the first aspect, before the receiving, by an AP, first information sent by a first STA, the method further includes:

receiving, by the AP, fourth information sent by a third STA, where the fourth information is used by the third STA to request a DSP from the AP;

after the sending, by the AP, second information to the first STA, the method further includes:

sending, by the AP, fifth information to the third STA, where the fifth information is used to instruct the third STA to send a data frame to the AP in a second DSP, a start time of the second DSP falls within a second preset time period following an end time of an SP of the third STA, the second DSP is pre-allocated to a fourth STA whose priority is lower than a priority of the third STA, and a delay of the third STA satisfies, in the second preset time period, a delay quality of service QoS requirement;

the first DSP is before the second DSP; and a priority of the data frame in the third STA is lower than the priority of the data frame in the first STA; or the priority of the data frame in the first STA is equal to a priority of the data frame in the third STA, and the delay of the first STA is greater than a delay of the third STA.

With reference to the eighth possible implementation of the first aspect, in a tenth possible implementation of the first aspect, the first DSP includes a first time range and a second time range, and the first time range is before the second time range.

Before the receiving, by an AP, first information sent by a first STA, the method further includes:

receiving, by the AP, fourth information sent by a third STA, where the fourth information is used by the third STA to request a DSP from the AP.

The second information is specifically used to instruct the first STA to send the data frame to the AP in the first time rage of the first DSP.

After the sending, by the AP, second information to the first STA, the method further includes:

sending, by the AP, fifth information to the third STA, where the fifth information is used to instruct the third STA to send a data frame to the AP in the second time range of the first DSP.

A priority of the data frame in the third STA is lower than the priority of the data frame in the first STA; or the priority of the data frame in the first STA is equal to a priority of the data frame in the third STA, and the delay of the first STA is greater than a delay of the third STA.

According to a second aspect, an example of the present disclosure provides a channel access period allocation method, including:

sending, by a first station STA, first information to an access point AP, where the first information is used by the first STA to request a dynamic service period DSP from the AP;

receiving, by the first STA, second information sent by the AP, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period; and sending, by the first STA, the data frame to the AP in the first DSP.

With reference to the second aspect, in a first possible implementation of the second aspect, the first DSP includes a first sub-DSP and a second sub-DSP, and the first sub-DSP is before the second sub-DSP;

the receiving, by the first STA, second information sent by the AP includes:

receiving, by the first STA in the first sub-DSP, the second information sent by the AP; and the sending, by the first STA, the data frame to the AP in the first DSP includes:

sending, by the first STA, the data frame to the AP in the second sub-DSP.

With reference to the second aspect or the first possible implementation of the second aspect, in a second possible implementation of the second aspect, before the receiving, by the first STA, second information sent by the AP, the method further includes:

receiving, by the first STA, active instruction information sent by the AP, where the active instruction information is used to instruct the first STA to remain active in the first DSP.

With reference to the first or the second possible implementation of the second aspect, in a third possible implementation of the second aspect, before the receiving, by the first STA in the first sub-DSP, the second information sent by the AP, the method further includes:

receiving, by the first STA at a start time of the first sub-DSP, third information sent by the AP, where the third information is used by the AP to perform coding control and/or lens control on the first STA.

With reference to any one of the second aspect, or the first to the third possible implementations of the second aspect, in a fourth possible implementation of the second aspect, the first information is indicated by using an SP request frame, or is indicated by using a QoS control field in a data frame; and the second information is indicated by using a grant frame.

With reference to any one of the second aspect, or the first to the fourth possible implementations of the second aspect, in a fifth possible implementation of the second aspect, before the sending, by a first STA, first information to the AP, the method further includes:

receiving, by the first STA, allocation information of a channel access period sent by the AP, where the allocation information of the channel access period includes: an allocation type of a channel access period of the first STA is SP allocation, and an allocation type of a channel access period of the second STA is DSP allocation.

With reference to the fifth possible implementation of the second aspect, in a sixth possible implementation of the second aspect, the allocation information of the channel access period further includes a preset data frame priority, and the preset data frame priority is a lowest priority of a data frame that can be sent by occupying the first DSP; and the sending, by a first STA, first information to the AP includes:

sending the first information to the AP if the first STA determines that a priority of the data frame in the first STA is higher than or equal to the preset data frame priority, where the first information includes the priority of the data frame in the first STA.

According to a third aspect, an example of the present disclosure provides a channel access period allocation apparatus. The apparatus is an access point AP, and the apparatus includes:

a receiving module, configured to receive first information sent by a first station STA, where the first information is used by the first STA to request a dynamic service period DSP from the AP; and a sending module, configured to send second information to the first STA, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period.

With reference to the third aspect, in a first possible implementation of the third aspect, the first DSP includes a first sub-DSP and a second sub-DSP, and the first sub-DSP is before the second sub-DSP; and that a sending module sends second information to the first STA, where the second information is used to instruct the first STA to send a data frame to the AP in the first DSP specifically includes:

sending the second information to the first STA in the first sub-DSP, where the second information is used to instruct the first STA to send the data frame to the AP in the second sub-DSP.

With reference to the first possible implementation of the third aspect, in a second possible implementation of the third aspect, the sending module is further configured to send the second information to the second STA in the first sub-DSP, so that the second STA enters a sleep mode in the second sub-DSP.

With reference to any one of the third aspect, the first or the second possible implementation of the third aspect, in a third possible implementation of the third aspect, the sending module is further configured to send active instruction information to the first STA, where the active instruction information is used to instruct the first STA to remain active in the first DSP.

With reference to the first or the second possible implementation of the third aspect, in a fourth possible implementation of the third aspect, the sending module is further configured to send third information to the first STA at a start time of the first sub-DSP, where the third information is used by the AP to perform coding control and/or lens control on the first STA.

With reference to any one of the third aspect, or the first to the fourth possible implementations of the third aspect, in a fifth possible implementation of the third aspect, the first information is indicated by using an SP request frame, or is indicated by using a QoS control field in a data frame, and the second information is indicated by using a grant frame.

With reference to any one of the third aspect, or the first to the fifth possible implementations of the third aspect, in a sixth possible implementation of the third aspect, the sending module is further configured to send allocation information of a channel access period to the first STA and the second STA, where the allocation information of the channel access period includes: an allocation type of a channel access period of the first STA is SP allocation, and an allocation type of a channel access period of the second STA is DSP allocation.

With reference to the sixth possible implementation of the third aspect, in a seventh possible implementation of the third aspect, the apparatus further includes:

a processing module, configured to: if determining that a time interval between the end time of the SP of the first STA and a start time of a next available channel access period of the first STA cannot satisfy delay QoS requirement of the first STA, determine that the allocation type of the channel access period of the second STA is DSP allocation.

With reference to the sixth or the seventh possible implementation of the third aspect, in an eighth possible implementation of the third aspect, the allocation information of the channel access period further includes a preset data frame priority, and the preset data frame priority is a lowest priority of a data frame that can be sent by occupying the first DSP, so that the first STA determines to send the first information to the AP according to the preset data frame priority; and the first information includes a priority of the data frame in the first STA.

With reference to the eighth possible implementation of the third aspect, in a ninth possible implementation of the third aspect, the receiving module is further configured to receive fourth information sent by a third STA, where the fourth information is used by the third STA to request a DSP from the AP;

the sending module is further configured to send fifth information to the third STA, where the fifth information is used to instruct the third STA to send a data frame to the AP in a second DSP, a start time of the second DSP falls within a second preset time period following an end time of an SP of the third STA, the second DSP is pre-allocated to a fourth STA whose priority is lower than a priority of the third STA, and a delay of the third STA satisfies, in the second preset time period, a delay quality of service QoS requirement;

the first DSP is before the second DSP; and a priority of the data frame in the third STA is lower than the priority of the data frame in the first STA; or the priority of the data frame in the first STA is equal to a priority of the data frame in the third STA, and the delay of the first STA is greater than a delay of the third STA.

With reference to the eighth possible implementation of the third aspect, in a tenth possible implementation of the third aspect, the first DSP includes a first time range and a second time range, and the first time range is before the second time range.

The receiving module is further configured to receive fourth information sent by a third STA, where the fourth information is used by the third STA to request a DSP from the AP.

The second information is specifically used to instruct the first STA to send the data frame to the AP in the first time rage of the first DSP.

The sending module is further configured to send fifth information to the third STA, where the fifth information is used to instruct the third STA to send a data frame to the AP in the second time range of the first DSP.

A priority of the data frame in the third STA is lower than the priority of the data frame in the first STA; or the priority of the data frame in the first STA is equal to a priority of the data frame in the third STA, and the delay of the first STA is greater than a delay of the third STA.

According to a fourth aspect, an example of the present disclosure provides a channel access period allocation apparatus. The apparatus is a first STA, and the apparatus includes:

a sending module, configured to send first information to an access point AP, where the first information is used by the first STA to request a dynamic service period DSP from the AP; and a receiving module, configured to receive second information sent by the AP, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period; where the sending module is further configured to send the data frame to the AP in the first DSP.

With reference to the fourth aspect, in a first possible implementation of the fourth aspect, the first DSP includes a first sub-DSP and a second sub-DSP, and the first sub-DSP is before the second sub-DSP;

the receiving module is specifically configured to receive the second information sent by the AP in the first sub-DSP; and that the sending module sends the data frame to the AP in the first DSP specifically includes: sending the data frame to the AP in the second sub-DSP.

With reference to the fourth aspect or the first possible implementation of the fourth aspect, in a second possible implementation of the fourth aspect, the receiving module is further configured to:

receive active instruction information sent by the AP, where the active instruction information is used to instruct the first STA to remain active in the first DSP.

With reference to the first or the second possible implementation of the fourth aspect, in a third possible implementation of the fourth aspect, the receiving module is further configured to receive, at a start time of the first sub-DSP, third information sent by the AP, where the third information is used by the AP to perform coding control and/or lens control on the first STA.

With reference to any one of the fourth aspect, or the first to the third possible implementations of the fourth aspect, in a fourth possible implementation of the fourth aspect, the first information is indicated by using an SP request frame, or is indicated by using a QoS control field in a data frame; and the second information is indicated by using a grant frame.

With reference to the fourth aspect, or the first to the fourth possible implementations of the fourth aspect, in a fifth possible implementation of the fourth aspect, the receiving module is further configured to:

receive allocation information of a channel access period sent by the AP, where the allocation information of the channel access period includes: an allocation type of a channel access period of the first STA is SP allocation, and an allocation type of a channel access period of the second STA is DSP allocation.

With reference to the fifth possible implementation of the fourth aspect, in a sixth possible implementation of the fourth aspect, the allocation information of the channel access period further includes a preset data frame priority, and the preset data frame priority is a lowest priority of a data frame that can be sent by occupying the first DSP; and that a sending module sends first information to the AP specifically includes:

sending the first information to the AP if the first STA determines that a priority of the data frame in the first STA is higher than or equal to the preset data frame priority, where the first information includes the priority of the data frame in the first STA.

According to a fifth aspect, an example of the present disclosure provides a channel access period allocation system, including the access point AP according to any one of the third aspect or the first to the tenth possible implementations of the third aspect, and the first station STA according to any one of the fourth aspect or the first to the sixth possible implementations of the fourth aspect.

The examples of the present disclosure provide a channel access period allocation method, apparatus, and system. An AP receives first information sent by a first station STA, where the first information is used by the first STA to request a DSP from the AP; the AP sends second information to the first STA, where the second information is used to instruct the first STA to send a data frame to the AP in a first DSP, a start time of the first DSP falls within a first preset time period following an end time of a service period SP of the first STA, the first DSP is pre-allocated to a second STA whose priority is lower than a priority of the first STA, and a delay of the first STA satisfies a delay quality of service QoS requirement in the first preset time period. In this way, a STA with a higher priority can occupy a DSP that falls within a first preset time period following an end time of an SP of the STA and that is of a STA with a lower priority, to send a data frame to the AP, and a delay of the data frame in the STA with a higher priority can satisfy a delay QoS requirement.

Persons of ordinary skill in the art may understand that all or some of the steps of the method examples may be implemented by a program instructing relevant hardware. The program may be stored in a computer-readable storage medium. When the program runs, the steps of the method examples are performed. The foregoing storage medium includes: any medium that can store program code, such as a ROM, a RAM, a magnetic disk, or an optical disc.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Finally, it should be noted that the foregoing examples are merely intended for describing the technical solutions of the present disclosure, but not for limiting the present disclosure. Although the present disclosure is described in detail with reference to the foregoing examples, persons of ordinary skill in the art should understand that they may still make modifications to the technical solutions described in the foregoing examples or make equivalent replacements to some or all technical features thereof, without departing from the scope of the technical solutions of the examples of the present disclosure.

What is claimed is:

1. A channel access period allocation method, comprising:
receiving, by an access point (AP), first information sent by a first station (STA), wherein the first information is used by the first STA to request a dynamic service period (DSP) from the AP; and
sending, by the AP, second information to the first STA, wherein the second information is used to instruct the first STA to send a data frame to the AP in a first DSP, wherein a start time of the first DSP falls within a first preset time period following an end time of a service period (SP) of the first STA, and the first DSP requested by the first STA is pre-allocated to a second STA having a priority that is lower than that of the first STA, wherein a time delay of the first STA for sending the data frame to the AP satisfies a time delay requirement of a quality of service (QoS) in the first preset time period, wherein the first DSP comprises a first sub-DSP and a second sub-DSP, and the first sub-DSP is before the second sub-DSP;

sending, by the AP, third information to the first STA at a start time of the first sub-DSP, wherein the third information is used by the AP to perform on the first STA at least one of: a coding control and a lens control; and wherein the sending, by the AP, the second information to the first STA comprises:

sending, by the AP, the second information to the first STA in the first sub-DSP, wherein the second information is used to instruct the first STA to send the data frame to the AP in the second sub-DSP.

2. The method according to claim 1, further comprising: sending, by the AP, the second information to the second STA in the first sub-DSP, so that the second STA enters a sleep mode in the second sub-DSP.

3. The method according to claim 1, further comprising: sending, by the AP, active instruction information to the first STA, wherein the active instruction information is used to instruct the first STA to remain active in the first DSP.

4. A channel access period allocation apparatus, wherein the apparatus is an access point (AP), and the apparatus comprises:
a processor; and
a non-transitory computer readable storage medium storing instructions that are executable by the processor, wherein the instructions are executed by the processor to:
receive first information sent by a first station (STA), wherein the first information is used by the first STA to request a dynamic service period (DSP) from the AP; and
send second information to the first STA, wherein the second information is used to instruct the first STA to send a data frame to the AP in a first DSP, wherein a start time of the first DSP falls within a first preset time period following an end time of a service period (SP) of the first STA, and the first DSP requested by the first STA is pre-allocated to a second STA having a priority that is lower than that of the first STA, wherein a time delay of the first STA for sending the data frame satisfies a time delay requirement of a quality of service QoS in the first preset time period, wherein the first DSP comprises a first sub-DSP and a second sub-DSP, and the first sub-DSP is before the second sub-DSP;
send, by the AP, third information to the first STA at a start time of the first sub-DSP, wherein the third information is used by the AP to perform on the first STA at least one of: a coding control and a lens control; and
wherein the send, by the AP, the second information to the first STA comprises:
send, by the AP, the second information to the first STA in the first sub-DSP, wherein the second information is used to instruct the first STA to send the data frame to the AP in the second sub-DSP.

5. The apparatus according to claim 4, wherein the instructions are further included and executed to send the second information to the second STA in the first sub-DSP, so that the second STA enters a sleep mode in the second sub-DSP.

6. The apparatus according to claim 4, wherein the instructions are further included and executed to send active instruction information to the first STA, wherein the active instruction information is used to instruct the first STA to remain active in the first DSP.

7. The apparatus according to claim 4, wherein the first information is indicated by using an SP request frame, or is indicated by using a QoS control field in a data frame; and the second information is indicated by using a grant frame.

8. The apparatus according to claim 4, wherein the instructions are further included and executed to send allocation information of a channel access period to the first STA and the second STA, wherein the allocation information of the channel access period comprises: an allocation type of a channel access period of the first STA being a SP allocation, and an allocation type of a channel access period of the second STA being a DSP allocation.

9. The apparatus according to claim 8, wherein the instructions are further included and executed to:
if determining that a time interval between the end time of the SP of the first STA and a start time of a next available channel access period of the first STA cannot satisfy the time delay requirement of the QoS of the first STA, determine that the allocation type of the channel access period of the second STA is the DSP allocation.

10. The apparatus according to claim 8, wherein the allocation information of the channel access period further comprises a preset data frame priority, and the preset data frame priority is a lowest priority of a data frame that can be sent by occupying the first DSP, so that the first STA determines to send the first information to the AP according to the preset data frame priority; and the first information comprises a priority of the data frame of the first STA.

11. A channel access period allocation apparatus, wherein the apparatus is a first station (STA), and the apparatus comprises:
a processor; and
a non-transitory computer readable storage medium storing instructions that are executable by the processor, wherein the instructions are executed by the processor to:
send first information to an access point (AP), wherein the first information is used by the first STA to request a dynamic service period (DSP) from the AP; and
receive second information sent by the AP, wherein the second information is used to instruct the first STA to send a data frame to the AP in a first DSP, wherein a start time of the first DSP falls within a first preset time period following an end time of a service period (SP) of the first STA, and the first DSP requested by the first STA is pre-allocated to a second STA having a priority that is lower than that of the first STA, wherein a time delay of the first STA for sending the data frame to the AP satisfies a time delay requirement of a quality of service (QoS) in the first preset time period, the first DSP comprises a first sub-DSP and a second sub-DSP, and the first sub-DSP is before the second sub-DSP; and
the instructions are further included and executed to:
receive the second information sent by the AP in the first sub-DSP;
receive, at a start time of the first sub-DSP, third information sent by the AP, wherein the third information is used by the AP to perform on the first STA at least one of: a coding control and a lens control; and
send the data frame to the AP in the first DSP in the second sub-DSP.

12. The apparatus according to claim 11, wherein the instructions are further included and executed to:

receive active instruction information sent by the AP, wherein the active instruction information is used to instruct the first STA to remain active in the first DSP.

* * * * *